(12) United States Patent
Froggatt et al.

(10) Patent No.: US 7,440,087 B2
(45) Date of Patent: Oct. 21, 2008

(54) IDENTIFYING OPTICAL FIBER SEGMENTS AND DETERMINING CHARACTERISTICS OF AN OPTICAL DEVICE UNDER TEST BASED ON FIBER SEGMENT SCATTER PATTERN DATA

(75) Inventors: Mark Earl Froggatt, Blacksburg, VA (US); Brian Joseph Soller, Blacksburg, VA (US)

(73) Assignee: Luna Innovations Incorporated, Roanoke, VA (US)

( * ) Notice: Subject to any disclaimer, the term of this patent is extended or adjusted under 35 U.S.C. 154(b) by 307 days.

(21) Appl. No.: 11/062,740

(22) Filed: Feb. 23, 2005

(65) Prior Publication Data

US 2005/0219512 A1    Oct. 6, 2005

Related U.S. Application Data

(60) Provisional application No. 60/546,962, filed on Feb. 24, 2004.

(51) Int. Cl.
*G01N 21/00* (2006.01)
*G02B 6/00* (2006.01)

(52) U.S. Cl. .................................. 356/73.1; 385/13
(58) Field of Classification Search ................ 356/73.1; 385/13–38
See application file for complete search history.

(56) References Cited

U.S. PATENT DOCUMENTS

| | | | |
|---|---|---|---|
| 5,317,147 A | 5/1994 | Dandliker et al. | |
| 6,097,488 A | 8/2000 | Grek et al. | |
| 6,229,599 B1 | 5/2001 | Galtarossa | |
| 6,426,496 B1 | 7/2002 | Froggatt et al. | |
| 6,946,646 B2 * | 9/2005 | Chen et al. ............. | 250/227.17 |
| 7,126,678 B2 * | 10/2006 | Fayolle et al. .............. | 356/73.1 |
| 2002/0159134 A1 * | 10/2002 | Ghera et al. ................ | 359/334 |

OTHER PUBLICATIONS

Huttner et al, "Local Birefringence Measurements in Single-Mode Fibers with Coherent Optical Frequency-Domain Reflectometer", IEEE Photonics Technology Letters, vol. 10, No. 10, Oct. 1998.*
Huttner et al., "Local Birefringence Measurements in Single-Mode Fibers with Coherent Optical Frequency-Domain Reflectometer", IEEE Photonics Technology Letters, vol. 10, No. 10, Oct. 1998.
U.S. Appl. No. 11/062,740, filed Jan 24, 2005; Inventors: Froggatt et al.

(Continued)

*Primary Examiner*—Tarifur R Chowdhury
*Assistant Examiner*—Tara S Pajoohi
(74) *Attorney, Agent, or Firm*—Nixon & Vanderhye P.C.

(57) ABSTRACT

Complex data is obtained from OFDR backscatter measurements for an optical device under test (DUT). That complex scatter pattern data may be used along with a previously-determined fiber segment pattern to identify the fiber segment within the DUT, even when the DUT is an optical network DUT that includes multiple fibers coupled to perform one or more functions. In other non-limiting example applications, the OFDR scatter pattern data can be used to identify where in the DUT a loss occurred and where in the DUT a temperature change occurred.

20 Claims, 6 Drawing Sheets

OTHER PUBLICATIONS

U.S. Appl. No. 11/371,229, filed Mar. 9, 2006; Inventor: Froggatt.
U.S. Appl. No. 11/808,260, filed Jun. 7, 2007; Inventor: Froggatt.
Limberger et al., "OLCR Characterization of Efficient Bragg Gratings in Optical Fiber", SPIE vol. 2044, pp. 272-283, no date.
Wayne V. Sorin, "High Resolution Optical Fiber Reflectometry Techniques", SPIE vol. 1797 Distributed and Multiplexed Fiber Optic Sensors II (1992); pp. 109-118.

* cited by examiner

IDENTIFYING OPTICAL FIBER SEGMENTS AND DETERMINING CHARACTERISTICS OF AN OPTICAL DEVICE UNDER TEST BASED ON FIBER SEGMENT SCATTER PATTERN DATA

CLAIM OF BENEFIT OF PROVISIONAL PATENT APPLICATION

Priority is claimed from U.S. Provisional Patent Application No. 60/546,962, filed on Feb. 24, 2004. The contents of this provisional application are incorporated by reference.

TECHNICAL FIELD

The technical field relates to optical measurements, and more particularly, to advantageous new uses of Optical Frequency Domain Reflectometry (OFDR).

BACKGROUND AND SUMMARY

Mixing between a reference signal and a data signal is often necessary to extract information about an optical device or network. A probe signal and a reference signal originating from the same source are typically mixed, resulting in fringes that can be detected and used to assess information about the device being probed. In interferometric sensing, a reference signal is mixed with a signal whose phase and/or amplitude is modified by a parameter to be measured. The mixing produces an interference signal, and the amplitude of the interference signal depends on how efficiently the two optical signals mix.

Optical Time-Domain Reflectometry (OTDR) is a widely used tool for identifying problems in large optical networks. OTDR instruments provide measurements of the level of scatter present in a section of fiber, or at a discrete interface over long distances. Optical Frequency Domain Reflectometry (OFDR) may be used to provide data similar to that provided by OTDR over shorter ranges (tens of meters for OFDR instead of 1000's of meters for OTDR) and higher resolutions (tens of microns for OFDR instead of tenths of meters for OTDR). This change in distance scale allows OFDR to be used in applications where the dimensions of interest are centimeters instead of meters such as when optical coupler and switch networks are constructed. For example, OFDR may be used in module-level and sub-module-level diagnostics. The inventors discovered that the ability of OFDR to measure the complex spectral reflectivity of Rayleigh backscatter as a function of fiber length yields surprising new and very useful results, as will be described later.

Scatter is the process of redirecting the propagation of light. In an optical fiber, this occurs when light encounters a change in the geometry of the fiber core, or a change in the local index of refraction of a fiber. Scatter generally occurs at any interface such as connectors, poor splices, collimating optics, etc. Typically, light scattered from the forward propagating direction into the backward propagating direction is of primary concern and is called a reflection. Rayleigh scatter, in the context of optical fiber, describes the light scattered in the fiber due to the random nature of the glass structure in and around the fiber core. Although Rayleigh scatter is random in nature, it is fixed because the random pattern of the glass structure is "frozen" into the fiber. Loss is the removal of light from the intended forward propagating mode. Scatter is a form of loss, as is bend radiation and molecular absorption.

Scattered light may be measured and characterized using OFDR. A highly monochromatic beam of light is injected into the optical system or device to be tested. The wavelength/frequency of that light is varied slowly with a time-linear sweep, and the optical signal back-scattered from the optical system is detected by coherently mixing the back-scattered signal with the reference input signal. The beat frequency component of the mixed signal, (corresponding to an interference signal), is measured to determine a position of the back-scattering (reflection) point in the optical system/fiber. The interference signal amplitude also determines a back-scattering factor and an attenuation factor for the reflected light.

When couplers are used in an optical network, reflectometric interrogation from one side of a coupler produces a measurement in which the backscatter from the two output legs of the coupler is combined into a single trace as illustrated in FIG. 1. Although scattering events and losses can be identified, one cannot determine from simple OFDR or OTDR measurements in which fiber a specific loss event occurred. Without the ability to distinguish different branches of a network, it is possible to identify that there is a faulty optical component in an optical network that contains multiple fibers, but nonetheless cut the wrong fiber when trying to replace the faulty component. In this and other types of cases, knowledge of which individual fiber caused a loss event (rather than the general information that one of the fibers caused a loss event) would be very helpful in achieving a quick and efficient repair of the system.

The inventors determined ways to use complex data obtained from OFDR measurements of backscatter for an optical device under test (DLT). A fiber segment DUT can be identified by itself, within a longer fiber DUT, or within an optical network DUT that includes multiple fibers coupled to perform one or more functions. In other example applications, OFDR backscatter data can be used to identify where in a DUT (and for a DUT with plural fibers, in which fiber) a loss occurred and to identify where in a DUT (and for a DUT with plural fibers, in which fiber) a change occurred (e.g., a temperature change resulting in a change in fiber length). These and other advantageous applications are achieved using previously-determined, complex OFDR measurements for fiber segments, with each fiber segment having its own associated "scatter pattern." In one example embodiment, a scatter pattern associated with the fiber segment is obtained and stored in memory. Optical Frequency Domain Reflectometry (OFDR) is used to obtain the scatter pattern. The scatter pattern may be, for example, a Rayleigh scatter pattern. The scatter pattern may then be used to identify the fiber segment.

Another example application uses the scatter pattern to locate a fiber segment in a device under test (DUT). The fiber segment scatter pattern corresponds to a first set of complex reflectivity numbers which are a function of frequency. OFDR is used to process the DUT and generate a second set of complex reflectivity numbers. A comparison is performed using the first and second sets of complex reflectivity numbers. The location of the fiber segment in the DUT is determined based on the comparison.

In one detailed example implementation, a first amplitude of the first set of complex reflectivity numbers is calculated and the mean is removed. A second amplitude of the second set of complex reflectivity numbers is calculated, and the mean is removed. The first and second amplitude signals are then cross-correlated, and the maximum cross-correlation is identified. The maximum cross-correlation corresponds to the location of the fiber segment in the DUT.

Other non-limiting example applications relate to calculating a loss associated with the fiber segment or a change in fiber length if there has been some kind of changed situation or condition. The first set of complex reflectivity numbers is shifted by an amount corresponding to the determined location, and a complex conjugate of the shifted first set of complex reflectivity numbers is calculated. The complex conjugate is multiplied by the second set of complex reflectivity numbers to generate a complex product. The complex product is averaged over a distance associated with the DUT. A change in amplitude of the averaged complex product is determined. The change typically corresponds to a loss associated with the fiber segment in the DUT as a function of distance along the DUT. Alternatively, a change in phase for the averaged complex product may be determined. The phase change corresponds to a temperature change that affects a fiber length associated with the DUT.

DETAILED DESCRIPTION

In the following description, for purposes of explanation and non-limitation, specific details are set forth, such as particular nodes, functional entities, techniques, protocols, standards, etc. in order to provide an understanding of the described technology. It will apparent to one skilled in the art that other embodiments may be practiced apart from the specific details disclosed below. In other instances, detailed descriptions of well-known methods, devices, techniques, etc. are omitted so as not to obscure the description with unnecessary detail. Individual function blocks are shown in the figures. Those skilled in the art will appreciate that the functions of those blocks may be implemented using individual hardware circuits, using software programs and data in conjunction with a suitably programmed microprocessor or general purpose computer, using applications specific integrated circuitry (ASIC), and/or using one or more digital signal processors (DSPs).

Figure 1:
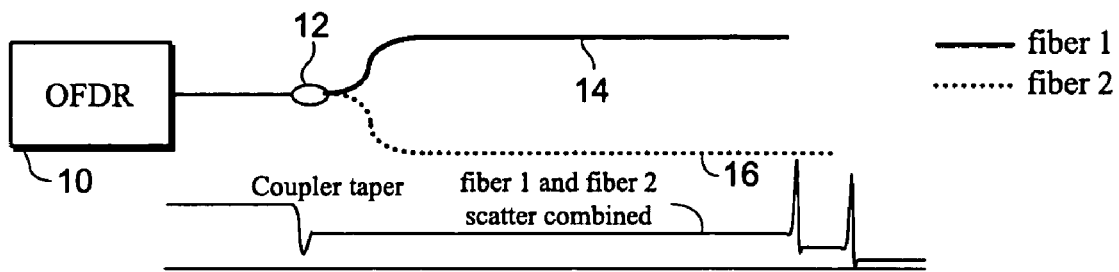
FIG. 1 illustrates an OFDR measurement of scatter from a 1×2 coupler and two fiber leads.

FIG. 1 illustrates an OFDR 10 used to measure scatter from a 1×2 coupler 12 coupled to two fiber leads 14 and 16. Fiber 14 is shown as a thick solid line throughout the figures and is labeled fiber 1. Fiber 16 is shown as a dotted line throughout the figures and is labeled fiber 2. Note that fiber 1 has a sharp bend labeled 18. Interrogation from the OFDR 10 produces a measurement where the scatter signals from the two fibers 1 and 2 are combined into a single scatter trace, as illustrated in the bottom of FIG. 1. Scattering events and losses can be identified from the OFDR scatter trace including the spike and amplitude loss at the coupler 12, the spike and amplitude loss at the end of fiber 1, and the spike and amplitude loss at the end of fiber 2.

Figure 2:
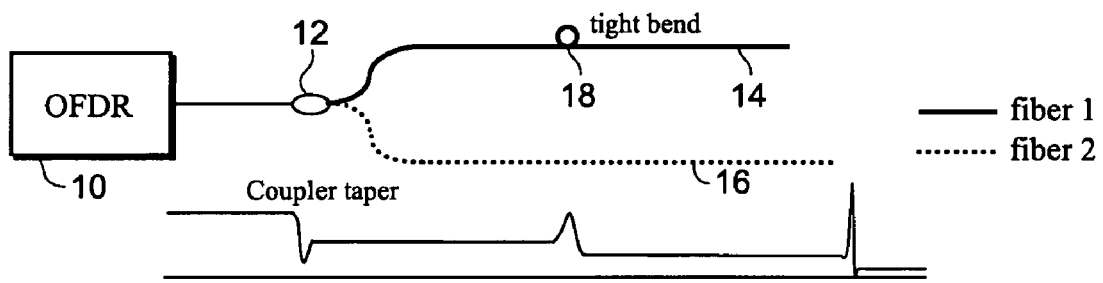
FIG. 2 illustrates an OFDR measurement of scatter from a 1×2 coupler and two fiber leads when a sharp bend is present in one of the fiber leads.

FIG. 2 illustrates an OFDR measurement of scatter from the 1×2 coupler 12 and fibers 1 and 2 when a sharp bend 18 is present in fiber 1. Although the corresponding scatter trace generated by the OFDR 10 clearly shows that a loss event occurred at or near the sharp bend 18 in fiber 1, one cannot readily determine from this OFDR measurement (or from an OTDR measurement) in which fiber 1 or 2 the event occurred. In many cases, knowledge of which fiber caused a loss event is very helpful in achieving a quick and efficient repair of an optical system. This is a real world problem because fibers in an optical network are not always labeled or color-coded. As a result, the wrong fiber might easily be cut or replaced. There is also the problem of identifying at what location along a particular fiber a loss event occurred.

Problems with positively identifying a fiber segment in a larger network and locating where a loss event occurred along a fiber (as well as other problems) are resolved using OFDR measurements as now described. The extremely high resolution of OFDR measurements and the complex reflectivity measurements obtained from an OFDR instrument are used to make and store scatter pattern measurements for specific fiber segments. Those scatter patterns may then be used to identify the location and characteristics of the fiber segments in a larger network—even in the presence of overlapping signals.

Assume that two fibers are color-coded red and blue. Their respective OFDR-generated scattering pattern can be described as a function of distance as follows:

$$\sigma_{red0}(z) = \rho_{red0}(z) e^{i\phi_{red0}(z)} \quad (1)$$

$$\sigma_{blue0}(z) = \rho_{blue0}(z) e^{i\phi_{blue0}(z)} \quad (2)$$

When the two scattering fields $\sigma_{red0}(z)$ and $\sigma_{blue0}(z)$ are superimposed (as they will be when connected to the two split leads of a coupler and in most DUT's in general), the amplitude of the combined scattering will be:

$$|\sigma_{sum}(z)|^2 = |\sigma_{red}(z-z_{red})|^2 + |\sigma_{blue}^*(z-z_{blue})|^2 + \sigma_{red}(z-z_{red})\sigma_{blue}^*(z-z_{blue}) + \sigma_{blue}(z-z_{blue})\sigma_{red}^*(z-z_{red}) \quad (3)$$

From equation (3), one can see that there is a component of the total scatter amplitude of the system that is highly correlated to both the original red fiber and blue fiber scatter patterns. When a cross-correlation is performed between $|\sigma_{red}(z)|^2$ and $|\sigma_{sum}(z)|^2$, a large peak occurs at $z=z_{red}$. The large cross-correlation peak effectively identifies the red segment fiber. Thus, the two original scattering patterns for the red and blue fiber segments act as reference keys that can be used to locate a particular fiber segment, even in the presence of other scattering elements, e.g., other fibers.

If a fiber is physically altered through a sharp bend, for example, this will impose a slowly varying envelope upon the scatter data from that fiber segment. The previously-determined scatter patterns are defined as $\sigma_{red0}(z)$ and $\sigma_{blue0}(z)$, and the new scatter measurements including the fiber segments are defined as $\sigma_{redx}(z)$ and $\sigma_{bluex}(z)$. The data measured for the DUT formed by the coupler and the two fiber segments is then:

$$\sigma_{coupler}(z) = \Delta_{red}(z)\rho_{red0}(z)e^{i\phi_{red0}(z)+i\delta_{red}(z)} + \Delta_{blue}(z)\rho_{blue0}(z)e^{i\phi_{blue0}(z)+i\delta_{blue}(z)} \quad (4)$$

where $\rho$ denotes the amplitude of the previously-determined scatter pattern data, and $\phi$ denotes the phase of the previously-determined scatter pattern data. The relative change in amplitude and phase between the previously-determined scatter pattern data set and the newly-measured data set is given by, $\Delta$ and $\delta$, respectively.

Multiplying the complex-conjugate of the previously-determined scatter pattern data set by the newly-measured data set, where the complex-conjugate of the previously-determined scatter pattern data set is shifted so as to align with the fiber segment in the new data set, results in:

$$\sigma_{coupler}(z)\sigma_{red0}*(z) = \rho_{red0}^2(z)\Delta_{red}(z)e^{i\delta_{red}(z)} + \rho_{red0}(z)\rho_{blue0}(z)\Delta_{blue}(z)e^{i\phi_{blue0}(z)-i\phi_{blue}(z)---i\phi_{red0}(z)} \quad (5)$$

Figure 3:
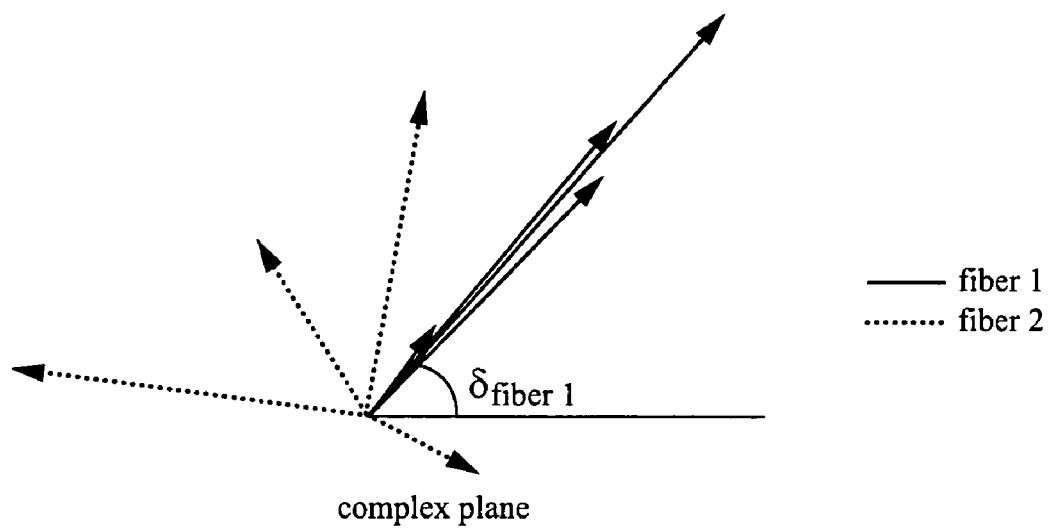
FIG. 3 is a phasor diagram in the complex plane of two fiber scattering patterns.

Note that the term associated with the red segment of fiber now contains only a slowly-varying phase term, $\delta_{red}$. If the phasors associated with the red and blue terms are examined over a region where $\delta_{red}$ remain approximately constant, the red terms (the first term in equation (5)) line up along at about the same phase angle, and the blue terms (the second term in equation (5)) produce vectors at random angles, as shown in FIG. 3.

Looking at the expected values of the terms in equation (5) over lengths where $\Delta$ and $\delta$ are approximately constant, one sees that the expected value of the blue term is zero. The expected value of the amplitude of the red term is the average value of the red amplitude, and the expected value of the red phase is the presumed static phase change $\delta_{red}$, as shown in the following equation:

$$<[\sigma_{redx}(z)+\sigma_{bluex}(z)]\sigma_{red0}*(z)>=<\rho_{red0}^2(z)> \\ <\Delta_{red}(z)><e^{i\delta_{red}(z)}>=<\rho_{red0}^2>\Delta_{red}e^{i<\delta_{red}>} \quad (6)$$

Averaging, indicated by $< >$, over the data produced using Equation (5) over a large number of points isolates the amplitude and phase effects associated with the red fiber.

Figure 4:
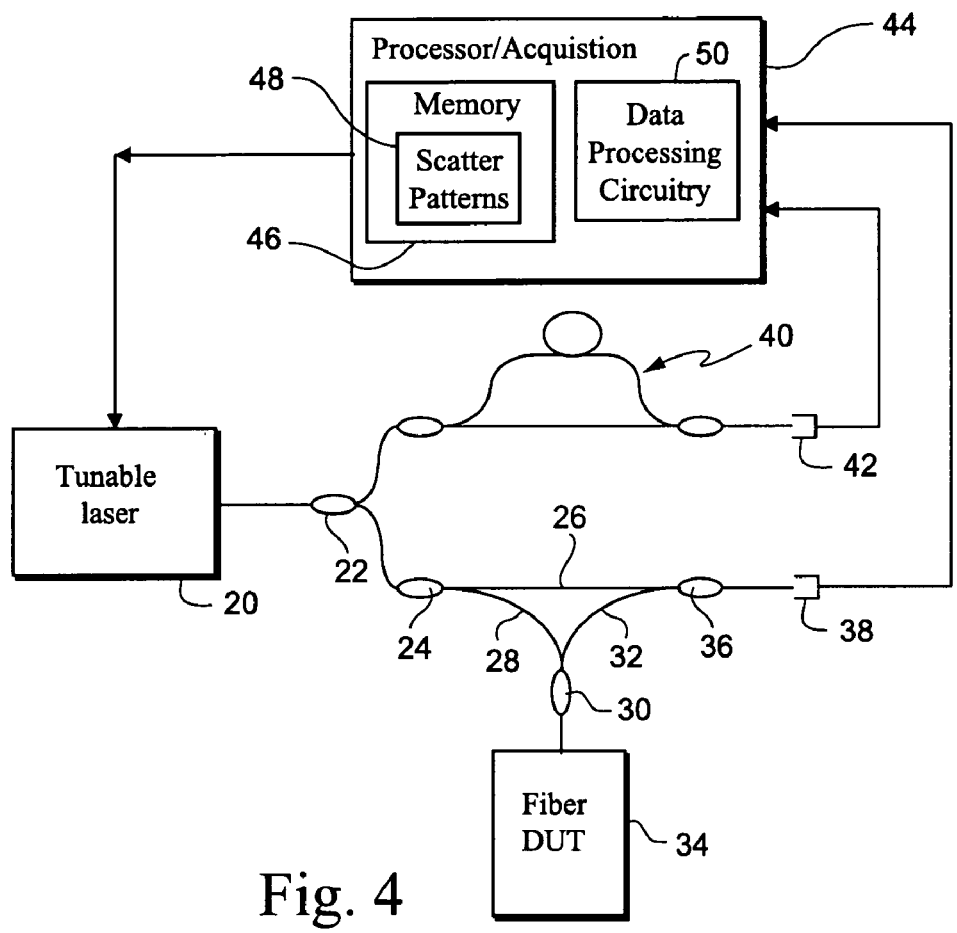
FIG. 4 is a diagram illustrating an OFDR system for measuring one or more optical characteristics of an optical device under test (DUT)

FIG. 4 is a diagram illustrating an OFDR system for measuring one or more optical characteristics of a fiber segment or some other an optical device under test (DUT). A tunable laser 20 is scanned through a range of frequencies or wavelengths. The laser light is provided to splitter 22 which divides the laser light into two paths. The first path is a laser path 40 that is detected by optical-to-electrical detector 42 and provided to the processor/acquisition unit 44 in order to associate DUT optical intensity signals with a corresponding frequency/wavelength. The second path routes the laser light to splitter 24, which splits the light into a reference path 26 and a DUT input path 28. The DUT input light is input to the DUT 34 via a coupler 30, and the back-scattered light from the DUT is passed via coupler 30 and fiber 32 for coherent combination with the reference path light at combiner 36. The combined reference and DUT signal is detected at optical-to-electrical detector 38 and provided to the processor/acquisition unit 44 for processing. As described in the background, the detected scattered light may be characterized using OFDR. The interference signal amplitude also determines a back-scattering factor and an attenuation factor for the reflected light. The beat frequency component of the mixed signal, (corresponding to an interference signal), is used to determine a position of the back-scattering (reflection) point in the optical system/fiber.

As was illustrated in FIG. 1, when couplers are used in a network, reflectometric interrogation from one side of a coupler produces a measurement in which the backscatter from the two output legs of the coupler, where the coupler and the fiber segments make up the DUT, is combined into a single trace. Although scattering events and losses can be identified, traditional OFDR measurements do not identify a specific fiber in which loss events occurred. But based on the analysis set forth above including equations (1)-(6), this and other limitations can be overcome.

The processing unit 44 includes a memory 46 that contains one or more algorithms for implementing equations (1)-(6) above using the data processor 50 as will be described further below in accordance with several flowcharts. Detected optical signals are processed to produce a "scatter pattern" for individual fiber segments or other optical components. One example scatter pattern is a Rayleigh scatter pattern. Scatter patterns for different fiber segments or other optical devices are stored in the scatter pattern memory 48.

Figure 5:
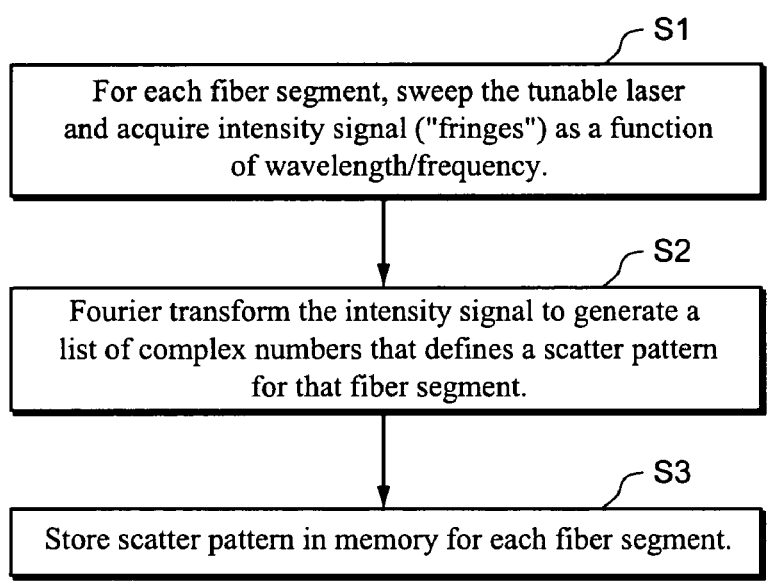
FIG. 5 is a flow chart illustrating example steps for determining a scatter pattern for a fiber segment.

FIG. 5 is a flow chart illustrating example steps for determining a scatter pattern for a fiber segment (or other optical device) using the OFDR apparatus in FIG. 4 and standard OFDR techniques. For each fiber segment, the tunable laser 20 is swept through a range of frequencies/wavelengths, and a corresponding light intensity signal as a function of frequency/wavelength is obtained (step S1). The light intensity at a particular frequency/wavelength is sometimes called a fringe. The light intensity signal is converted into an electrical time varying signal and is Fourier transformed in processing unit 44 into a corresponding list of complex numbers in the frequency domain that defines a scatter pattern for that fiber segment (step S2). The scatter pattern is stored in memory 48 (step S3). For example, the scatter pattern is associated with its fiber segment in some type of look up table.

Figure 6:
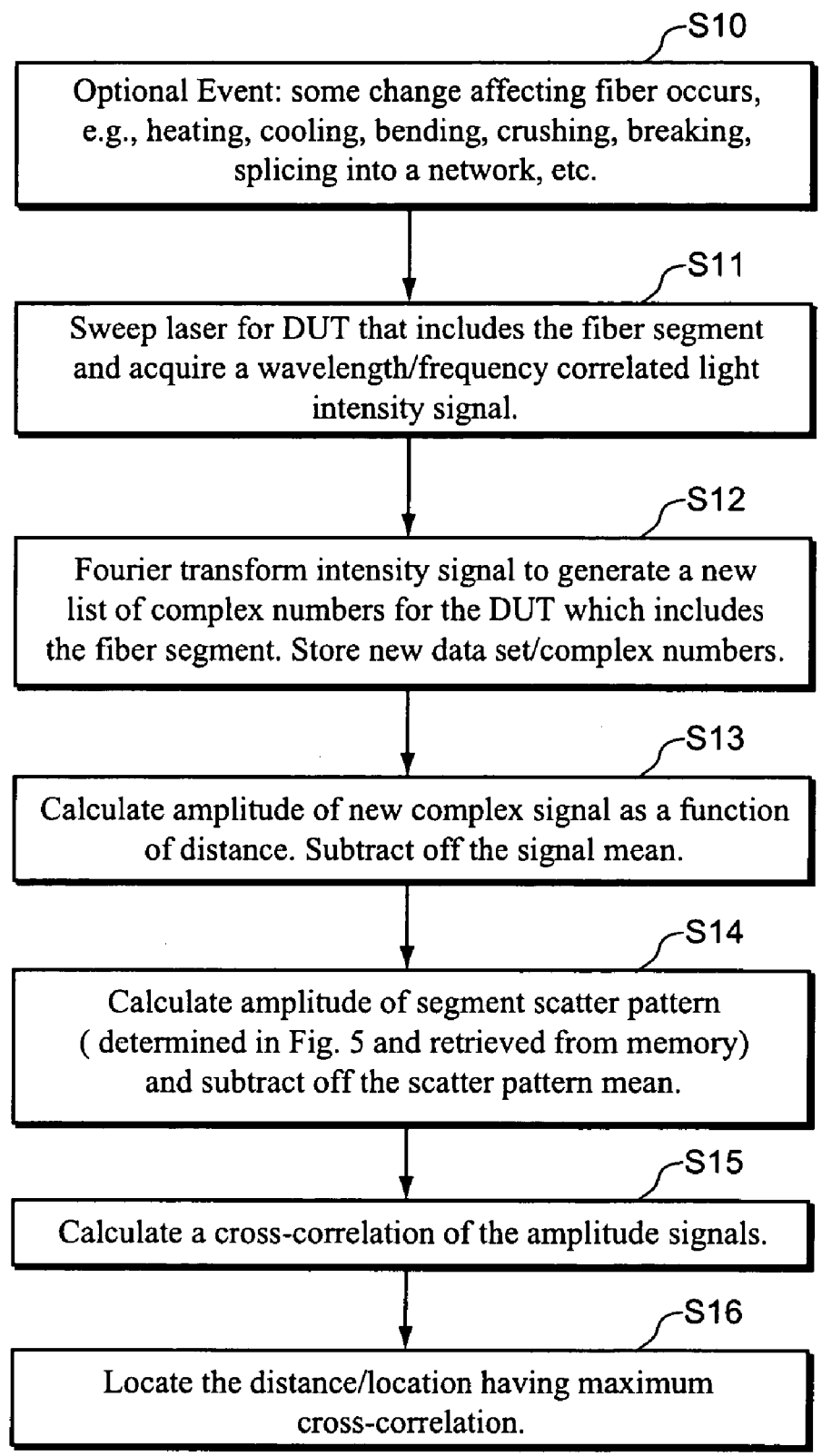
FIG. 6 is a flow chart illustrating example steps for identifying and determining a location of fiber segment in an optical network.

The fiber segment scatter pattern can be used in a wide variety of applications. One is basic identification. An unknown fiber segment is identified if its scatter pattern matches one of the scatter patterns stored in memory 48 for known fiber segments. Another example application is to accurately determine where a fiber segment is located either along a single fiber, amongst plural optical fibers, or in an optical network. FIG. 6 illustrates example steps for identifying and determining a location of fiber segment in an optical network referred to as a device under test (DUT) 34 with the understanding that a scatter pattern has already been determined and stored in memory 48 for this fiber segment. Step 10 notes that some change may have affected a fiber segment in the DUT 34 such as heating, cooling, bending, crushing, breaking, being spliced e.g., into a network, etc. The DUT 34 is coupled to the OFDR and swept by the laser 20 to acquire a frequency/wavelength correlated light intensity signal (step S11). The light intensity signal is Fourier transformed in unit 44 to generate a new list of complex numbers for the DUT 34 (step S11). The new or second set or list of complex numbers is stored in memory (the previously-determined fiber segment scatter pattern corresponds to the first set or list of complex numbers). The processor 50 calculates a list of amplitudes. Each complex entry in the list is made up of two real numbers. These numbers are vectorially summed to produce a single positive real number for each entry in the list as a function of distance (step S13). The mean amplitude introduces an offset to the calculated cross-correlation. If the data set is finite (and it usually is), the mean of the signals produces a triangularly-shaped bias or offset on the resulting correlation. This bias adds no information, and makes it more difficult to easily discern the peak marking where the two lists match. The mean is thus preferably removed. The processor 50 also calculates the amplitude of the first complex signal (corresponding to the scatter pattern of the fiber segment retrieved from memory 48) as a function of distance (step S14) and subtracts off the mean amplitude. The processor 50 then calculates a cross-correlation of the two amplitude signals (step S15), finds the maximum cross-correlation, and determines the location (in terms of distance along the fiber) of the fiber segment (step S16).

Most fiber-optic components are delivered with fiber segments (commonly called leads) as their input and output connections. If the identifying patterns for these components are stored, the individual components can be identified in a larger, more complicated network. Also, the quality of the connection to these components (i.e., the loss), can be assessed to verify proper assembly of systems independently and without disassembly.

Figure 7:
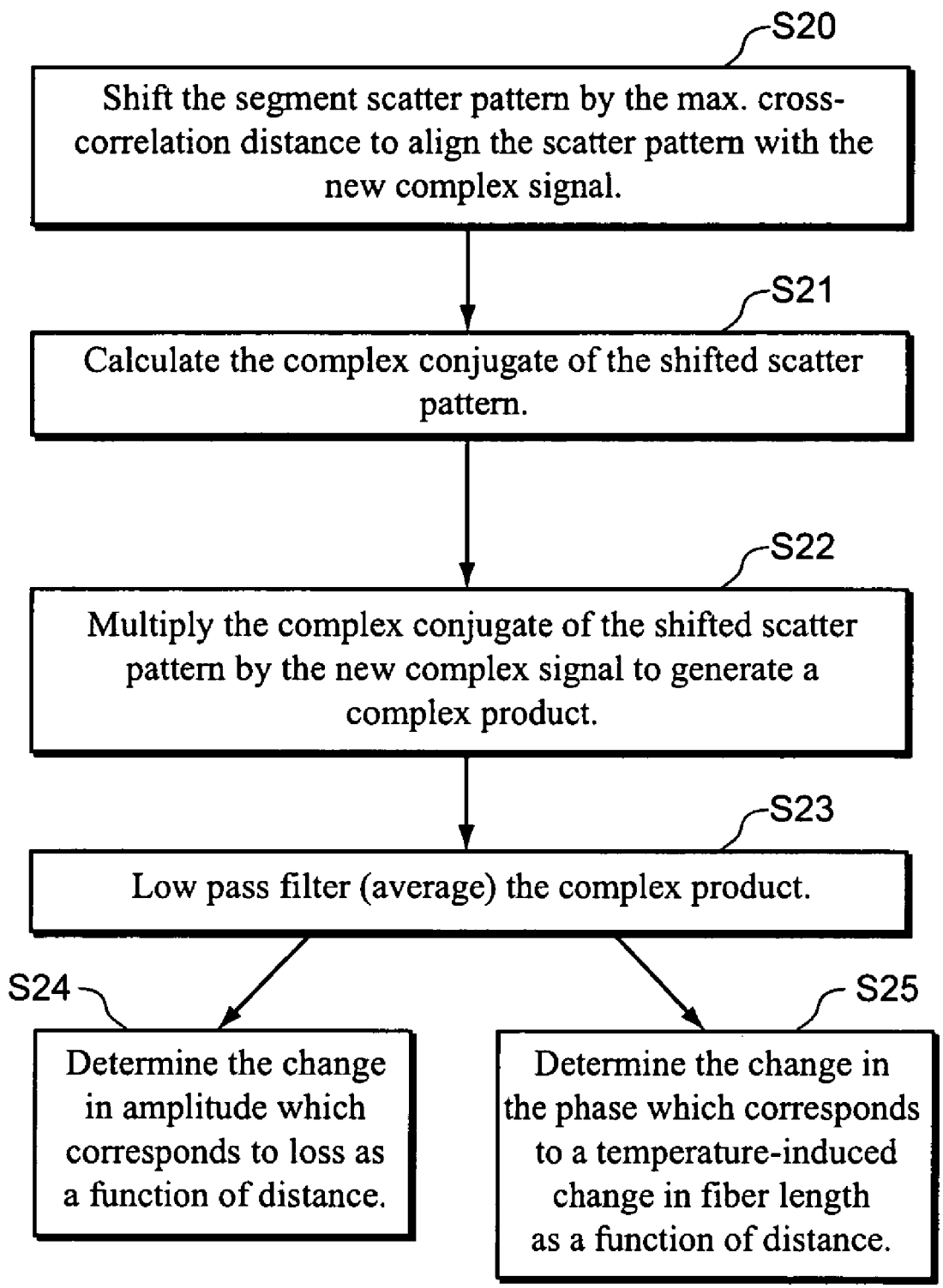
FIG. 7 is a flow chart illustrating example steps for determining loss in the fiber segment and temperature change or spectral shift as a function of length.

The fiber segment scatter pattern can be used to determine various optical characteristics of the optical network that includes the fiber segment. For example, FIG. 7 is a flow chart illustrating example steps for determining loss in the fiber segment and temperature change or spectral shift as a function of length. The processor 50 shifts the fiber segment scatter pattern retrieved from memory 48 by an amount corresponding to the location distance determined in step S16. This aligns the previously-determined scatter pattern with the location in the DUT scatter pattern where the fiber segment is located (step S20). The processor 50 calculates the complex conjugate of the shifted scatter pattern (step S21). The processor 50 then multiplies the complex conjugate of the shifted scatter pattern by the DUT complex signal to generate a complex product (step S22) (equation 5). The processor averages the complex product using a low pass filtering routine (step S23) (equation 6).

OFDR generally produces data points with a spacing of tens of microns in the optical fiber or waveguide. The multiplication in step S22 causes the signals matching the original pattern to line up, (as shown in FIG. 3, fiber 1 phasors), and signals that do not match to point in random directions. If hundreds of points representing several millimeters of optical fiber are summed together, only the phasors that lined up contribute to the sum. In this way, only information regarding the fiber of interest will remain thereby permitting identification of changes that have impacted the fiber segment in the DUT.

Specifically, changes can be detected in the scatter pattern amplitude and/or the scatter pattern phase for a specific fiber. For example, loss events are reflected in the amplitude data, and temperature changes are reflected in phase data. In step S24, a change in amplitude of the complex product is determined. This amplitude Δ corresponds to loss in the fiber segment, e.g., due to a bend, etc., as a function of distance along the DUT fiber. In step S25, the change (or derivative) of the phase of the complex product is determined. This phase δ correspond to a temperature-induced change in fiber length as a function of distance.

Figure 8:
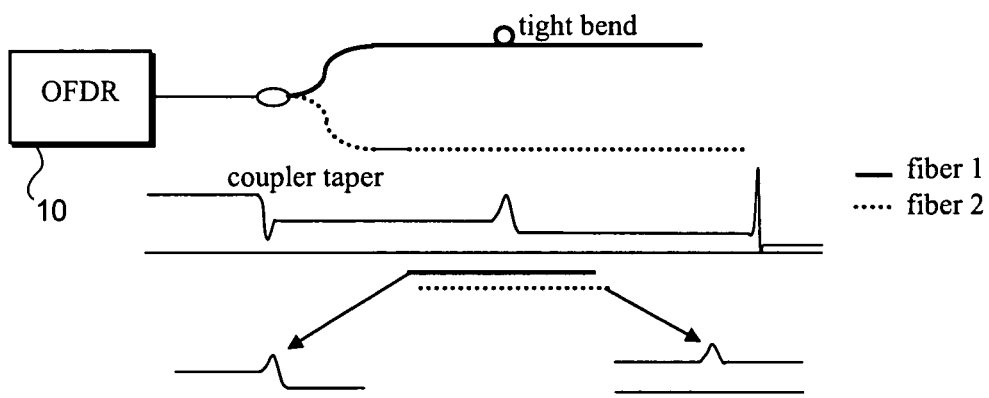
FIG. 8 illustrates an OFDR measurement in which a fiber segment scatter pattern is used to locate in which fiber and where along that fiber a loss occured.

FIG. 8 shows the red and blue fibers shown in FIG. 1, with the red fiber having a tight bend that should be detected and located. The optical intensity graph shown beneath the tight bend identifies the location of the bend, and the red fiber segment scatter pattern shown in the left lower corner indicates a loss in amplitude in the red fiber immediately after the bend. The blue fiber segment scatter pattern does not have any significant amplitude loss after the bend. Thus, it is now known where the bend is located and that it is in the red fiber.

Figure 9:
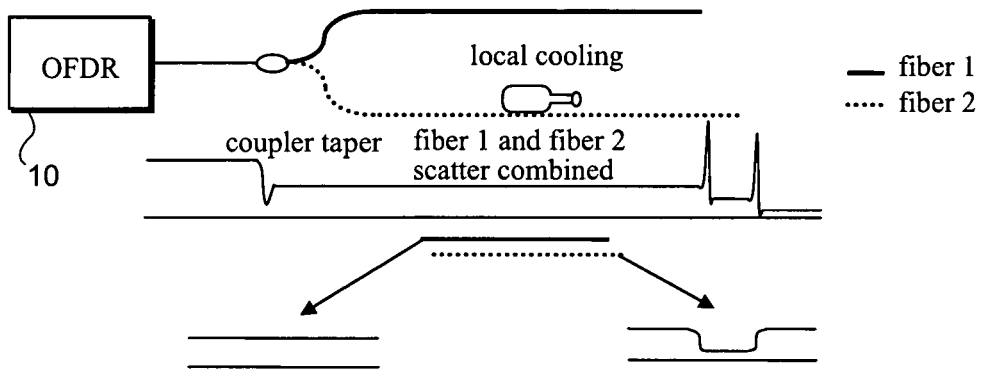
FIG. 9 illustrates an OFDR measurement in which a fiber segment scatter pattern is used to locate in which fiber and where along that fiber a local cooling has caused a change in length of the fiber.

FIG. 9 illustrates an OFDR measurement where a fiber segment scatter pattern is used to locate in which fiber and where along that fiber a local cooling has caused a change in length of the fiber. There is no spike in the OFDR optical intensity signal other than the coupler and at the fiber ends. The phase graphs in the lower left and right hand corners of FIG. 9 show no significant change in the red fiber segment but a significant phase change in the blue fiber segment. Phase changes reflect temperature changes, which result from a lengthened fiber (e.g., caused by heating) or a shortened fiber (e.g., caused by cooling).

Figure 10:
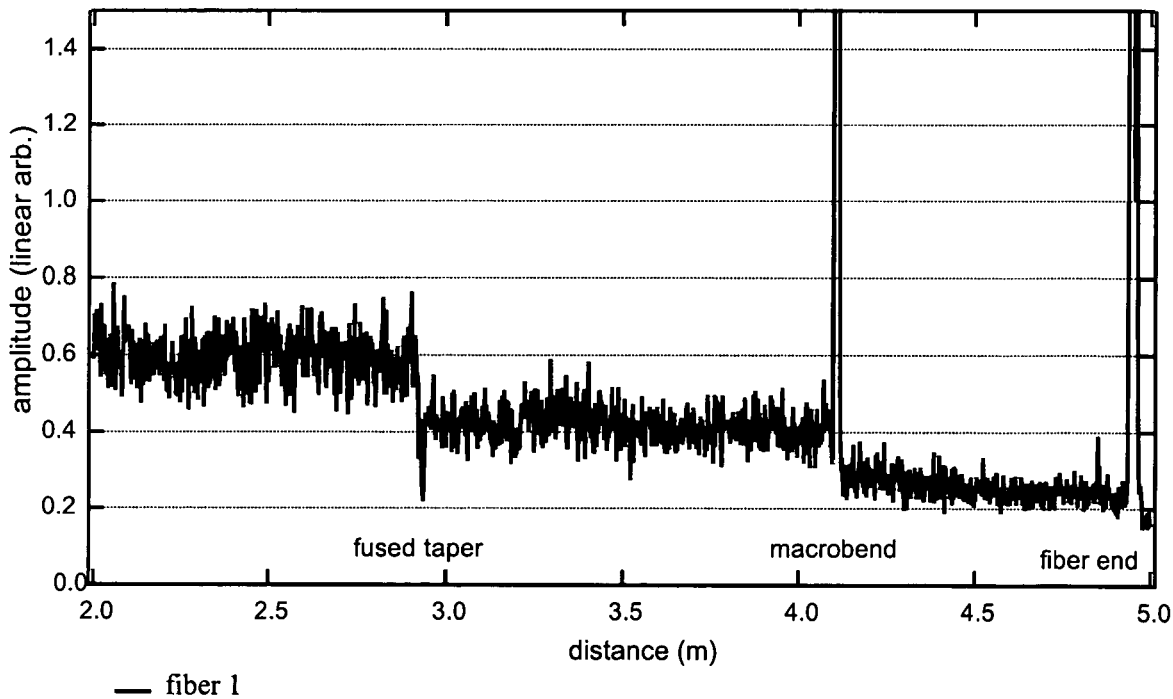
FIG. 10 is a graph showing scatter intensity amplitude data versus distance for the fiber lead with the sharp bend shown in FIG. 8.

In order to demonstrate these capabilities, two fibers were coded red and blue. Their respective Rayleigh scatter patterns were then measured over 20 nm in wavelength range centered at 1555 nm. From each fiber, a 0.66 m region of scatter was used as its scatter pattern. The two sections of fiber were then spliced to two outputs of a 1×2 fused coupler to create a DUT. Following this, a sharp bend was made in the red fiber as in FIG. 1, and the OFDR light intensity amplitude data for red fiber segment in the DUT is shown in FIG. 10. The amplitude spikes in FIG. 10 are consistent with those shown in FIG. 1.

Figure 11:
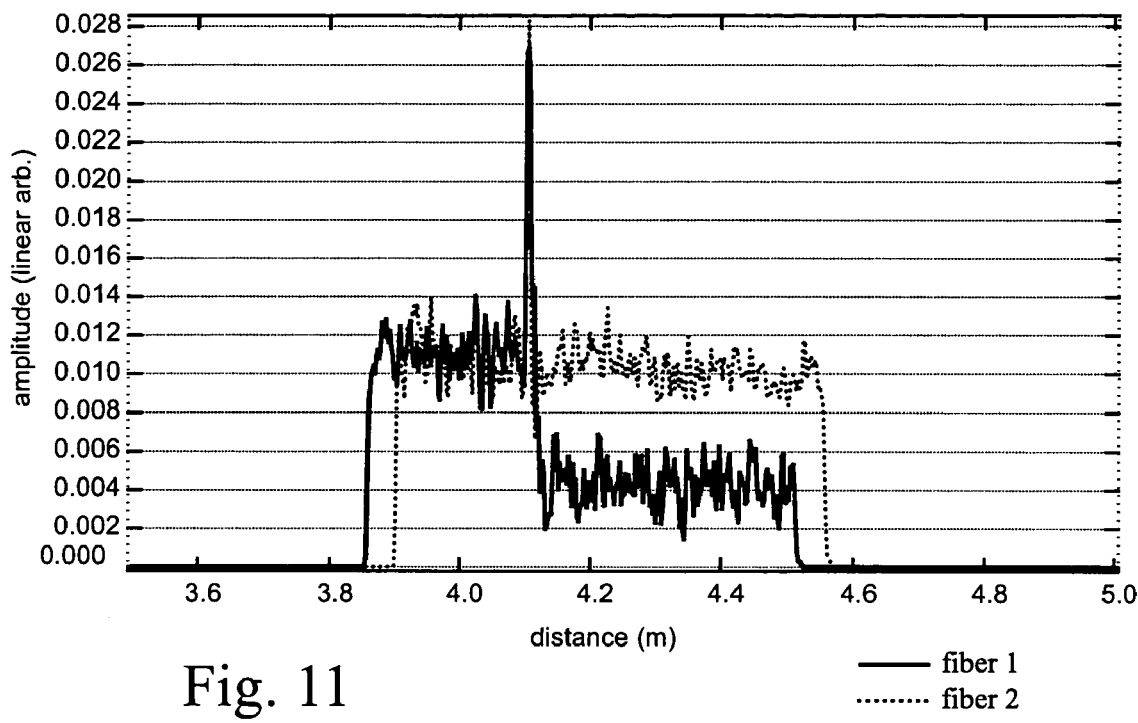
FIG. 11 is a graph showing scatter amplitude data versus distance for the two fibers for the tight bend situation.

Next, the DUT red and blue fiber segment OFDR measurement data were cross-correlated with the stored scatter pattern data for the red and blue fiber segments, appropriately shifted to the location of those segments in the DUT. The complex data sets produced by the cross-correlation were low-pass filtered and are shown FIG. 11. The increase in backscatter in the red fiber at the sharp bend "bleeds through" to the blue data. But the data on the other side of the bend shows that the red fiber has experienced loss, and that the blue fiber has not.

Figure 12:
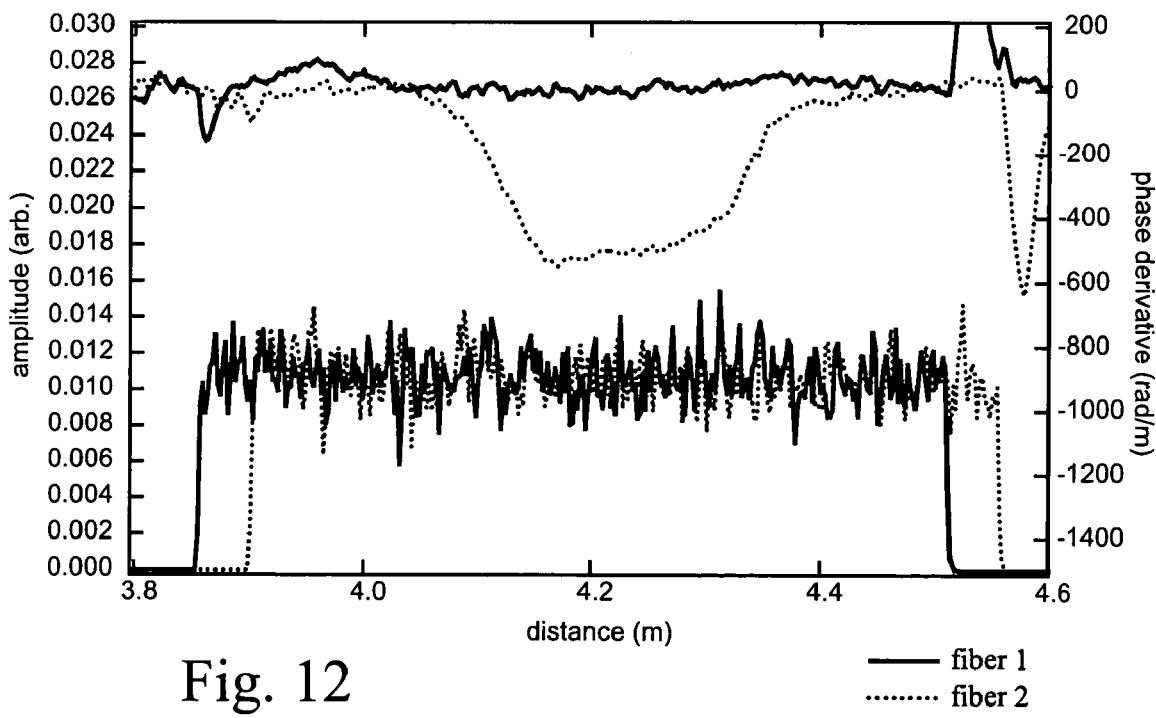
FIG. 12 is a graph showing scatter amplitude data and phase deviation data versus distance for the two fibers in the local fiber cooling situation.

In order to demonstrate temperature discrimination, a section of the blue fiber was cooled using a cold item commonly-available in refrigerators. This cold item was placed in contact with the blue fiber, and a new OFDR data set was generated and processed as described above. FIG. 12 plots both the amplitude and phase derivative of the red and blue fiber data sets. The amplitudes of both measurements are largely unaffected, but the phase change of the blue fiber is dramatically altered.

The above-described technology provides accurate complex scatter measurements which can be used to identify a specific section of fiber within a network. The scatter measurements may also be used to determine the loss between an observation point and the fiber section, localized loss events, and changes in fiber temperature. At a time when fiber-optic assembly and testing remains a challenge, such capabilities combined with automation provide a one-connect method for verifying network assembly and quality. Generally, assessing loss in a network requires an input connection and an output connection—two connections. Using the scatter levels, a single connection can be used to measure the loss to the point of interest. Often, there is no output connector at the location of interest, and adding optical connections is time-consuming and laborious. Avoiding the addition of these connections is extremely helpful. Typically, these tests are called "cut-back" tests in the industry because the fiber interconnects must be physically cut to observe the power level present at that point in the network, thus establishing the loss.

Although various embodiments have been shown and described in detail, the claims are not limited to any particular embodiment or example. None of the above description should be read as implying that any particular element, step, range, or function is essential such that it must be included in the claims scope. The scope of patented subject matter is defined only by the claims. The extent of legal protection is defined by the words recited in the allowed claims and their equivalents. No claim is intended to invoke paragraph 6 of 35 USC §112 unless the words "means for" are used.

The invention claimed is:

1. A method for identifying a fiber segment that is unique relative to all other fiber segments, comprising:
   obtaining a scatter pattern associated with the fiber segment, and
   using the scatter pattern to uniquely identify the fiber segment to distinguish the fiber segment from all other fiber segments including differentiating between individual different segments of the same type of fiber; and
   using the scatter pattern to identify a characteristic of the identified fiber segment.

2. The method in claim 1, further comprising:
   using Optical Frequency Domain Reflectometry (OFDR) to obtain the scatter pattern, and storing the scatter pattern in memory.

3. The method in claim 1, wherein the scatter pattern is a Rayleigh scatter pattern.

4. A method for identifying a fiber segment, comprising:
   obtaining a scatter pattern associated with the fiber segment using Optical Frequency Domain Reflectometry (OFDR), wherein the scatter pattern corresponds to a first set of complex reflectivity numbers as a function of frequency;
   using OFDR to process a DUT and generate a second set of complex reflectivity numbers;
   performing a comparison using the first and second sets of complex reflectivity numbers; and
   determining a location of the fiber segment in the DUT based on the comparison.

5. The method in claim 4, wherein the performing includes:
   calculating a first amplitude of the first set of complex reflectivity numbers;
   removing a mean value of the first set of complex reflectivity numbers from the first amplitude;
   calculating a second amplitude of the second set of complex reflectivity numbers;
   removing a mean value of the second set of complex reflectivity numbers from the second amplitude;
   cross-correlating the first and second amplitude signals; and
   identifying the maximum cross-correlation,
   wherein the maximum cross-correlation corresponds to the location of the fiber segment.

6. The method in claim 4, further comprising:
   shifting the first set of complex reflectivity numbers by an amount corresponding to the determined location;
   calculating a complex conjugate of the shifted first set of complex reflectivity numbers;
   multiplying the complex conjugate by the second set of complex reflectivity numbers to generate a complex product; and
   averaging the complex product over a distance associated with the DUT.

7. The method in claim 6, further comprising:
   determining a change in amplitude of averaged complex product,
   wherein the change corresponds to a loss associated with the DUT as a function of distance along the DUT.

8. The method in claim 6, further comprising:
   determining a change in phase for the averaged complex product,
   wherein the change corresponds to a change in fiber length associated with the DUT.

9. Apparatus for identifying an optical fiber segment that is unique relative to all other fiber segments, comprising:
   optical detection circuitry configured to obtain optical intensity signals associated with the optical fiber segment;
   processing circuitry configured to transform the intensity signals into a detected scatter pattern associated with the fiber segment that is unique compared to scatter patterns associated with all other fiber segments;
   a memory configured to store the detected scatter pattern; and
   comparison circuitry configured to compare the detected scatter pattern with a scatter pattern corresponding to an optical DUT to identify whether the fiber segment is included in the DUT as opposed to any other fiber segment.

10. The apparatus in claim 9, wherein the DUT has multiple fibers and the comparison circuitry is configured to identify whether the fiber segment is in the DUT, and if so, which fiber includes the fiber segment.

11. The apparatus in claim 9, wherein the comparison circuitry is configured to identify a location of the fiber segment in the DUT.

12. The apparatus in claim 9, wherein the detected scatter pattern is a Rayleigh scatter pattern.

13. The apparatus in claim 9, wherein the apparatus includes an Optical Frequency Domain Reflectometry (OFDR) instrument.

14. Optical apparatus, comprising:
   a memory for storing a first set of complex numbers corresponding to a scatter pattern for a fiber segment;
   optical processing circuitry configured to optically scan a device under test (DUT) over a range of wavelengths to acquire a light intensity signal;
   transformation circuitry for transforming the light intensity signal into a second set of complex numbers corresponding to a scatter pattern for the DUT;
   comparison circuitry configured to compare the first and second sets of complex numbers to produce information associated with a location of the fiber segment in the DUT.

15. The apparatus in claim 14, further comprising processing circuitry configured to:
   calculate a first amplitude of the first set of complex reflectivity numbers;
   remove a mean from the first amplitude;
   calculate a second amplitude of the second set of complex reflectivity numbers; and
   remove a mean from the second amplitude,
   wherein the comparison circuitry is further configured to:
   cross-correlate the first and second amplitude signals, and
   identify the maximum cross-correlation, the maximum cross-correlation corresponding to the location of the fiber segment.

16. The apparatus in claim 14, wherein the processing circuitry is further configured to:
   shift the first set of complex reflectivity numbers by an amount corresponding to the determined location;
   calculate a complex conjugate of the shifted first set of complex reflectivity numbers;
   multiply the complex conjugate by the second set of complex reflectivity numbers to generate a complex product; and
   average the complex product over a distance associated with the DUT.

17. The apparatus in claim 16, wherein the processing circuitry is further configured to:

determine a change in amplitude of averaged complex product, the change corresponding to a loss associated with the DUT as a function of distance along the DUT.

18. The apparatus in claim 16, wherein the processing circuitry is further configured to:
determine a change in phase for the averaged complex product, the change corresponding to a change in fiber length associated with the DUT.

19. The apparatus in claim 14, wherein the scatter pattern is a Rayleigh scatter pattern.

20. The apparatus in claim 14, wherein the apparatus includes an Optical Frequency Domain Reflectometry (OFDR) instrument.

* * * * *